United States Patent Office 3,282,937
Patented Nov. 1, 1966

3,282,937
BICYCLICALLY SUBSTITUTED AMINO-ALKANES
Wilfrid Klavehn, Schwetzingen, and Helmut Kraft,
Mannheim-Neckarhausen, Germany, assignors to Knoll
A.-G., Ludwigshafen (Rhine), Germany
No Drawing. Filed June 4, 1963, Ser. No. 285,217
Claims priority, application Germany, June 9, 1962,
K 46,969
17 Claims. (Cl. 260—247)

This invention relates to novel bicyclically substituted amino alkanes which possess valuable therapeutic properties having analgesic, spasmolytical, anti-tussive and antiphlogistic efficacy, to preparations containing such compounds as the essential active ingredient, and to a method of preparing said compounds.

The novel compounds of this invention include bicycloheptylidene amino alkanes and bicyclo-heptyl amino alkanes of the formulae

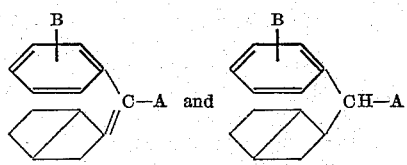

respectively, and the salts of physiologically tolerable inorganic and organic acids thereof, wherein A represents a lower dialkylamino lower alkylene, piperidino-lower alkylene, pyrrolidino-N-lower alkylene, morpholino-lower alkylene or N-lower alkyl piperidyl group and B is hydrogen, lower alkyl, lower alkoxy or chlorine.

The compounds of this invention are obtainable by (1) condensing, in an alcoholic solution or xylene suspension and in the presence of an alkaline condensing agent, e.g., in an alcoholic sodium ethylate solution, a phenyl acetonitrile of the formula

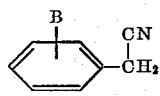

with bicyclo-(2,2,1)-heptanone, (2) reacting the bicyclo-(2,2,1)-heptenyl-2 compound thus obtained with an amine of the formula

X—A wherein X represents a reactive acid residue, e.g., chlorine, bromine, or toluene sulfonic acid group, and (3) eliminating the nitrile group of the compound so obtained by reaction with excess sodium amide to form the corresponding bicyclo-heptylidene amino alkane. This in turn can be converted into the corresponding bicyclo-heptyl amino alkane by catalytic hydrogenation and/or by conversion thereof into the acid addition salt with an inorganic or organic acid.

This reaction carried out, for example, to form 1-phenyl-1-[bicyclo-(2,2,1)-heptylidene - 2] - 3 - dimethylaminopropane and finally, if desired, the corresponding 1-phenyl-1[bicyclo(2,2,1)heptyl]-3-dimethylaminopropane, takes place as follows:

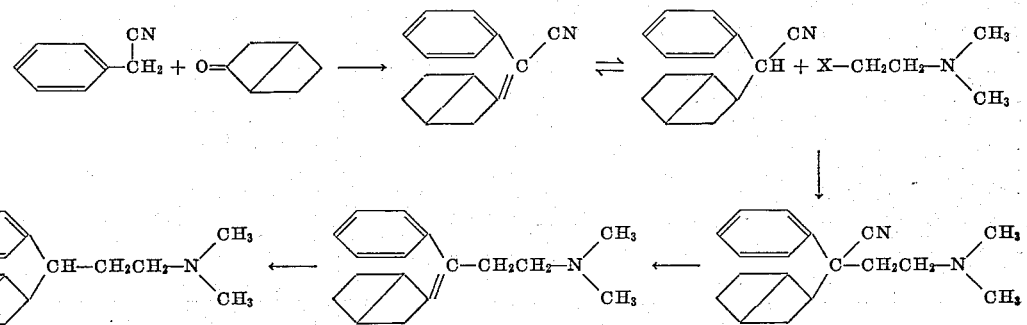
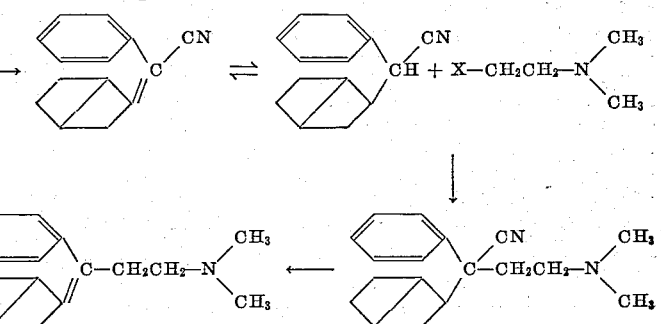

Suitable alkaline condensing agents include sodium ethylate, sodium amide and sodium hydride. The removal of the nitrile group can suitably be accomplished by the action of an excess of sodium amide in a solvent such as toluene, xylene or tetraline, preferably at the boiling temperature of the solvent.

The bicyclo-heptylidene amino alkanes can be converted into the corresponding bicyclo-heptyl amino alkanes by catalytic hydrogenation with the aid of such catalysts as platinum oxide in acetic acid solution or with Raney nickel catalysts in organic solvents.

It is not necessary to isolate the various intermediate products obtained in accordance with this embodiment of the method of this invention as illustrated in the foregoing equation, it being entirely feasible to carry out the reactions in a single operation.

The novel compounds of the invention can also be obtained by dehydrating, in the presence of water-binding agents, bicyclically substituted amino alkanols of the formula

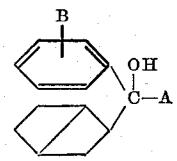

which in turn are obtainable in the manner described in U.S. Patent 2,789,110. Suitable water-binding agents include glacial acetic acid, mixtures thereof with concentrated sulfuric acid, syrupy phosphoric acid, acetic anhydride, zinc chloride and mixtures thereof.

The bicyclically substituted compounds of the invention are generally oily liquids that can be distilled under reduced pressure and which form crystallized and water soluble acid addition salts with inorganic and organic acids.

The new compounds possess valuable therapeutical properties and utility as medicaments. They combine in a specially advantageous manner analgesic, spasmolytical and antiphlogistic effects and are therefore particularly suitable as spasmoanalgesics. Since many spasms of the involuntary muscles can be traced back to inflammatory processes, the antiphlogistic properties of the new bicyclically substituted amino alkanes are also valuable in therapy. In connection with the analgesic effect, the products also have a cough soothing action or anti-tussive action.

The application of the new compounds of the invention in the therapy is preferably carried out by peroral administration in the form of sugar-coated pills. However, it is also possible to accomplish the administration by subcutaneous injection. The smallest single effective dosage unit should contain about 20 mg. per pill, the largest single dosage unit should contain about 100 mg. of the new compound. The preferred single dose amounts to about 50 mg. of the new compound. The preferred daily dosage is between about 150 and 200 mg. of amino alkane regardless of the manner of administration. Examination has shown that the new bicyclically substituted amino alkanes are tolerated without adverse reaction even when administered for an extended period of time.

Pertinent properties of compounds typical of the compounds of this invention, i.e., 1-phenyl-1-[bicyclo-(2,2,1) heptylidene-2]-3-dimethylaminopropane (Compound A) and the corresponding 1-phenyl-1-[bicyclo-(2,2,1)-heptyl-2]-3-dimethylaminopropane (Compound B), are indicated immediately below:

*Toxicity:* 50% LD (lethal dose) mouse mg./kg.

|  | Subcutaneous | Intravenous | Orally |
|---|---|---|---|
| Compound A | 126 | 32 | 260 |
| Compound B | 164 | 36 | 295 |

Analysis of chronic toxicity in animal tests has shown that the new compounds do not cause any disadvantageous alterations of the blood count, of the internal organs or tissue, even when they were administered for several weeks in therapeutically effective doses.

*Analgesia in percent* (electric impulse): tested animal—mouse.

|  | Dosage mg./kg. Subcutaneous | | |
|---|---|---|---|
|  | 10.0 | 25.0 | 50.0 |
| Compound A, Percent | 12 | 26 | 46 |
| Compound B, Percent | 9 | 24 | 42 |

*Spasmolytical action* (Lysis in percent):
Isolated intestine of the guinea-pig, barium chloride convulsion (spasm).

|  | Dosage mg./kg. Intravenous | | | | |
|---|---|---|---|---|---|
|  | 0.5 | 1.0 | 2.0 | 3.0 | 5.0 |
| Compound A, Percent | 26 | 50 | 73 | 70 | 65 |
| Compound B, Percent | 21 | 44 | 66 | 68 | 72 |

*Antiphlogistic effect* (in the rat-foot):
The antiphlogistic effect of the compounds in the rat-foot was examined by pharmacological tests after injection of dextran and croton-oil. The results, tabulated immediately below, showed that the new products produce an impressive alteration of the swellings produced by the said substances after subcutaneous, as well as peroral and intravenous administration to the white mouse.

| Subcutaneous | Compound A | | Compound B | |
|---|---|---|---|---|
|  | Croton-oil | Dextran | Croton-oil | Dextran |
|  | Percent | Percent | Percent | Percent |
| 1.0 mg./kg. | 18 | 6 | 13 | 4 |
| 2.0 mg./kg. | 24 | 16 | 20 | 12 |
| 5.0 mg./kg. | 32 | 26 | 26 | 17 |
| 10.0 mg./kg. | 34 | 31 | 29 | 26 |
| 25.0 mg./kg. | 35 | 36 | 32 | 30 |
| 50.0 mg./kg. | 64 | 60 | 55 | 52 |

The test procedure and calculations of antiphlogistic efficacy employed were those of H. Haas as published in "Naunyn-Schmiedeberg's Archiv für Experimentelle Pathologie und Pharmakologie," volume 227, Springer-Verlag (1956), page 84, as well as Haas, Hohagen, Kollmannsperger, "Vergleichende Untersuchungen mit Analgeticis," Arzneimittel-Forschung, Editio Cantor KG. (1953), pages 241 and 242. In the reported tests, the state of swelling and inflammation was induced by 0.1 ml. croton oil of 2 percent concentration or 0.1 ml. dextran of 6 percent concentration, both diluted in olive oil.

| Anti-tussive effect | Compound A |
|---|---|
| 50% effective cough-soothing dose [cough irritation, mechanically caused by soap-powder according to the method of Kroepfli, Helv. Phys, Act., 8, page 33 (1950)]; tested animal: cat. | 1.3 mg./kg. intravenous. |
| Cough irritation, caused by ammonia-aerosol in the guinea pig not narcotized; registration of the number of coughings in 2 minutes; protective dose of 2 minutes 50% effective dose. | 16.0 mg./kg. subcutaneous. |
| Cough reflex caused electrically, 50% effective dose [according to R. Domenjoz, Arch. exper, Path. und Pharmakol., 215, 19, (1952)]; tested animal: cat. | 1.3 mg./kg. intravenous. |

The invention is further illustrated by the following examples included to set forth the best modes now contemplated by the inventors of carrying out their invention.

*Example 1.—1-phenyl-1-[bicyclo-(2,2,1)-heptylidene-2] 3-dimethylaminopropane*

(a) To a solution of sodium alcoholate composed of 46 g. of sodium and 1200 ccm. of ethanol are added 900 g. of phenylacetonitrile at a temperature of −10° C. and at said temperature 220 g. of bicyclo-(2,2,1)-heptanone are introduced within one hour in small increments while stirring. The reaction mixture is stirred for further five hours at a temperature of −10° C. After standing for twelve hours at room temperature, the solution is poured into three kg. of ice-water, acidified with dilute hydrochloric acid and the organic phase is then taken up in ether. After drying over sodium sulfate, the solution is distilled in vacuo. [Bicyclo - (2,2,1) - heptylidene - 2] phenylacetonitrile having a boiling point of 154–159° C. at 5 mm. Hg was obtained in a yield of 327 g. (78 percent of theoretical). Instead of the sodium alcoholate solution, a suspension of sodium amide in xylene may also be used.

(b) A mixture of 206 g. of [bicyclo-(2,2,1)-heptylidene-2]-phenylacetonitrile, 50 g. of sodium amide and 500 ccm. of xylene is stirred for half an hour at room temperature. Thereafter the mixture is heated to 50° C. and a solution of 108 g. of 1-dimethylamino-2-chloroethane in 200 ccm. of xylene is added in such a manner that the reaction mixture remains at a temperature of 80–100° C. After concluding the addition, the mixture is kept at a temperature of 80–100° C. for another five hours. The mixture is decomposed by pouring it into two liters of ice-water, the benzolic phase is separated, the aqueous layer extracted twice with ether and the base is removed from the united organic extracts with dilute hydrochloric acid. The aqueous acid solution is alkalized with caustic soda lye while cooling and the separated oily base is taken up in ether. After drying over sodium sulfate, the mixture is distilled in vacuo to yield 221, 5 g.

of 1-phenyl-1 - [bicyclo-(2,2,1)-hepten-2-yle-2]-1-cyan-3-dimethylaminopropane (80 percent of theoretical) having a boiling point of 180–186° C. at 1.5 mm. Hg. The hydrochloride has a melting point of 172–174° C. (out of ethanol/ether).

The same intermediate compound is obtainable by carrying out the reaction with 29 g. of pulverized metallic sodium or with 31 g. of sodium hydride instead of 50 g. of sodium amide, the reaction being effectuated under the same conditions. The reaction may be also carried out by using 152 g. of 1-dimethylamino-2-bromoethane instead of 1-dimethylamino-2-chloroethane.

(c) The mixture of 131 g. of the cyanide obtained in part (b), 47 g. of sodium amide and 500 g. of xylene is boiled under reflux for thirty-six hours while stirring. To decompose the sodium amide, the brown colored reaction mixture is first mixed with 100 ccm. of ethanol and thereafter with one liter of water. The xylene phase is separated, the aqueous layer is extracted twice with ether and the base is removed from the united organic extracts with dilute hydrochloric acid. The acid solution is alkalized with caustic soda lye and the separated base is taken up in ether. After drying over sodium sulfate, the solution is distilled in vacuo to yield 106 g. of 1-phenyl-1-[bicyclo-(2,2,1)-heptylidene-2]-3 - dimethylaminopropane, $C_{18}H_{25}N$ (89 percent of theoretical), having a boiling point of 159–164° C. at 5–6 mm. Hg. The hydrochloride has a melting point of 205–206° C. (from ethanol/ether).

The process may also be modified by not isolating the product of Example 1(b) and eliminating the nitrile group by adding additional sodium amide and heating the mixture to about 140° C.

When the bicyclo-(2,2,1)-heptylidene compound of phenylacetonitrile obtained according to Example 1(a) is reacted with other representative amines, the following corresponding compounds are obtained by following the procedures of Examples 1(b) and 1(c):

| | Structure | Boiling point of the base | Melting point of the hydrochloride, °C. |
|---|---|---|---|
| 1 | phenyl-bicycloheptylidene-C—CH$_2$—CH$_2$—N(C$_2$H$_5$)$_2$ | 145–149° C./4 mm. Hg | 137–138 |
| 2 | phenyl-bicycloheptylidene-C—CH$_2$—CH$_2$—N(piperidinyl) | 156–163° C./4 mm. Hg | 216–218 |
| 3 | phenyl-bicycloheptylidene-C—CH$_2$—CH$_2$—N(pyrrolidinyl) | 162–164° C./4 mm. Hg | 225–226 |
| 4 | phenyl-bicycloheptylidene-C—CH$_2$—CH$_2$—N(morpholinyl) | 180–185° C./2 mm. Hg | 248–250 |
| 5 | phenyl-bicycloheptylidene-C—CH$_2$—CH$_2$—CH$_2$—N(CH$_3$)$_2$ | 177–181° C./4 mm. Hg | 202–203 |
| 6 | phenyl-bicycloheptylidene-C—(N-methylpiperidyl) | 168–171° C./3 mm. Hg | 258–260 |
| 7 | phenyl-bicycloheptylidene-C—CH$_2$—CH(CH$_3$)—N(CH$_3$)$_2$ | 124–130° C./0.6 mm. Hg | 198–199 |

Example 2.—1-phenyl-1-[bicyclo-(2,2,1)-heptyl-2]-3-dimethylaminopropane

Ten grams of 1-phenyl-1-[bicyclo-(2,2,1)-heptylidene-2]-3-dimethylaminopropane, obtained according to Example 1, are dissolved in 100 ccm. of glacial acetic acid and hydrogenated in the presence of a catalyst of 0.2–0.5 g. of platinum oxide and hydrogen at an ordinary temperature and atmospheric pressure until the calculated quantity of hydrogen of 880 ccm. is reached. After evaporating the glacial acetic acid in vacuo, the residue is dissolved in water, alkalized with casutic soda lye and the separated base is taken up in ether. After drying over sodium sulfate, the solution is distilled in vacuo. The boiling point of the 1-phenyl-1-[bicyclo-(2,2,1)-heptyl-2]-3-dimethylaminopropane base, $C_{18}H_{27}N$, is 122–124° C./4 mm. Hg.

The other bicycloheptylidene compounds of Example 1 can be converted to the corresponding saturated derivatives by catalytic hydrogenation in accordance with the same procedure. Thus the following derivatives are obtained.

By a similar procedure starting with 1-(2-methoxyphenyl)-1-[bicyclo-(2,2,1)-heptyl-2]-3-piperidino-propanol-1, the compound 1-(2-methoxyphenyl-1-[bicyclo-(2,2,1)-heptylidene-2]-3-piperidino-propane, $C_{22}H_{31}NO$, having a boiling point of 166–172° C./0.4 mm. Hg is obtained. The hydrochloride has a melting point of 168–170° C. (from methyl ethyl ketone).

From 1-(4-chlorophenyl)-1-[bicyclo-(2,2,1)-heptyl-2]-3-piperidino-propanol-1, the compound 1-(4-chlorophenyl)-1-[bicyclo-(2,2,1)-heptylidene-2]-3-piperidino-propane, having a boiling point at 160–162° C./0.2 mm. Hg is obtained. The hydrochloride has a melting point of 240–241° C. (from methyl ethyl ketone).

Correspondingly, 1-(4-methylphenyl)-1-[bicyclo-(2,2,1)-heptyl-2]-3-piperidino-propane of the formula

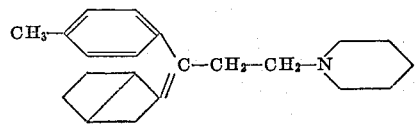

|  |  | Boiling point of the base |
|---|---|---|
| 8 | CH—CH₂—CH₂—N(C₂H₅)₂ (bicycloheptyl) | 135–137° C./0.05 mm. Hg. |
| 9 | CH—CH₂—CH₂—N(azetidine) (bicycloheptyl) | 146–148° C./0.1 mm. Hg. |
| 10 | CH—CH₂—CH₂—N(morpholino) (bicycloheptyl) | 160–163° C./0.2 mm. Hg. |
| 11 | CH—CH₂—CH₂—CH₂—N(CH₃)₂ (bicycloheptyl) | 132–135° C./0.05 mm. Hg. |
| 12 | CH—(N-methylpiperidine) (bicycloheptyl) | 147–149° C./0.05 mm. Hg. |

Example 3.—1-pheynl-1-[bicyclo-(2,2,1)-heptylidene-2]-3-piperidino-propane

A mixture of 22 g. of concentrated sulfuric acid and 11 g. of glacial acetic acid is added dropwise in the course of 30 minutes, while stirring at 50–60° C., to a solution of 27.4 g. of 1-phenyl-1-[bicyclo-(2,2,1)-heptyl-2]-3-piperidino-propanol-1 in 22 g. of glacial acetic acid. The reaction solution is kept at 50° C. for 1½ hours while stirring, thereafter poured into a mixture of ice and 350 ccm. of 2 N-caustic soda lye and the separated oily base is taken up in ether. After drying over sodium sulfate, the solution is distilled under reduced pressure to yield 21.2 g. of 1-phenyl-1-[bicyclo-(2,2,1)-heptylidene-2]-3-piperidino-propane (83 percent of theoretical) having a boiling point of 159–162° C./4 mm. Hg. The compound is identical with that of compound No. 2 in Example 1.

having a boiling point of 165–169° C./0.5 mm. Hg is obtained by starting with 1-(4-methylphenyl)-1-[bicyclo-(2,2,1)-heptyl-2]-3-piperidino-propanol-1. The hydrochloride has a melting point of 235° C.

Example 4.—1-phenyl-1-[bicyclo-(2,2,1)-heptyl-2]-3-piperidino-propane

Ten grams of 1-phenyl-1-[bicyclo-(2,2,1)-heptylidene-2]-3-piperidino-propane are dissolved in 100 ccm. of methanol and hydrogenated with five grams of Raney-nickel at 80° C. and a hydrogen overpressure of 80 atmospheres until the calculated quantity of hydrogen (760 ccm.) is absorbed. After evaporating the methanol under reduced pressure, the residue is distilled in vacuo. The boiling point of the base is 176–179° C./0.4 mm. Hg. The hydrochloride has a melting point of 214–215° C. (from ethanol/ether).

We claim:
1. A compound of the group consisting of (1) bicycloheptylidene amino alkanes of the formula

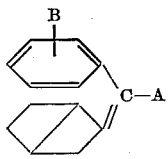

(2) bicyclo-heptyl amino alkanes of the formula

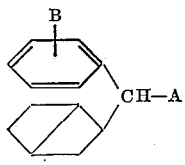

and (3) the salts of physiologically tolerable acids thereof, wherein A represents a member of the group consisting of lower dialkylamino-lower alkylene, piperidino-lower alkylene, pyrrolidino-lower alkylene, morpholino-lower alkylene, and N-lower alkyl piperidyl, and B represents a member of the group consisting of hydrogen, lower alkyl, lower alkoxy and chlorine.

2. 1-phenyl-1-[bicyclo-(2,2,1) - heptylidene-2] - 3-dimethylamino-propane.
3. 1-phenyl-1-[bicyclo-(2,2,1) - heptylidine-2] - 3-diethylamino-propane.
4. 1-phenyl-1 - [bicyclo-(2,2,1) - heptylidene-2] - 3-piperidino-propane.
5. 1-phenyl-1 - [bicyclo-(2,2,1) - heptylidene-2] - 3-pyrrolino-propane.
6. 1-phenyl-1 - [bicyclo-(2,2,1) - heptylidene-2] - 3-morpholino-propane.
7. 1-phenyl-1-[bicyclo-(2,2,1) - heptylidene-2] - 4-dimethylamino butane.
8. 1-phenyl-1-[bicyclo-(2,2,1) - heptylidene-2] - 3-dimethylamino butane.
9. 1-phenyl-1-[bicyclo-(2,2,1) - heptylidene-2] - 1-(N-methyl-4-piperidyl)methane.
10. 1-(2-methoxyphenyl) - 1-[bicyclo-(2,2,1) - heptylidene-2]-3-piperidino propane.
11. 1-(4-chlorophenyl) - 1-[bicyclo - (2,2,1) - heptylidene-2]-3-piperidino propane.
12. 1-(4-methylphenyl) - 1-[bicyclo-(2,2,1) - heptylidene-2]-3-piperidino propane.
13. 1-phenyl-1-[bicyclo-(2,2,1) - heptyl-2] - 3-dimethylamino propane.
14. 1-phenyl-1-[bicyclo-(2,2,1) - heptyl-2] - 3-diethylamino propane.
15. 1-phenyl-1 - [bicyclo-(2,2,1) - heptyl-2] - 3-pyrrolidino propane.
16. 1-phenyl-1-[bicyclo-(2,2,1) - heptyl-2] - 3-morpholino propane.
17. 1-phenyl-1-[bicyclo - (2,2,1) - heptyl-2] - 1-(N-methyl-4-piperidyl) methane.

References Cited by the Examiner
UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,362,614 | 11/1944 | Calva | 167—22 |
| 2,789,110 | 4/1957 | Klavehn | 260—294.7 |
| 2,916,490 | 12/1959 | Shenck | 260—247 |
| 2,993,895 | 7/1961 | Winthrop | 260—247 |
| 3,039,930 | 6/1962 | Gray | 167—65 |
| 3,060,091 | 10/1962 | Witkin | 167—65 |

OTHER REFERENCES

Harding et al., J. Chem. Society, vol. XCIII, pages 1943, 1945 and 1947 (1908).

Janssen, Paul A. J., Synthetic Analgesics, Pergamon Press, page 13, (1960).

McElvain et al., J, Am. Chem. Society, vol. 72, pages 384–389 (1950).

ALEX MAZEL, *Primary Examiner.*

FRANK CACCIAPAGLIA, JR., NICHOLAS S. RIZZO, *Examiners.*

PAUL SABATINE, JOSE TOVAR, *Assistant Examiners.*